United States Patent [19]

Ohkawa et al.

[11] Patent Number: 5,009,296

[45] Date of Patent: Apr. 23, 1991

[54] POWER TRANSMITTING APPARATUS FOR USE IN VEHICLE

[75] Inventors: Osamu Ohkawa, Sakato; Tetsuya Tamahoko, Koganei; Eisuke Imanaga, Tokyo, all of Japan

[73] Assignee: Tokyo Seat Co., Ltd., Asaka, Japan

[21] Appl. No.: 366,195

[22] Filed: Jun. 8, 1989

Related U.S. Application Data

[63] Continuation-in-part of Ser. No. 135,948, Dec. 21, 1987, abandoned.

[30] Foreign Application Priority Data

| Dec. 24, 1986 | [JP] | Japan | 61-313567 |
| Dec. 24, 1986 | [JP] | Japan | 61-313568 |
| Dec. 24, 1986 | [JP] | Japan | 61-313569 |
| Dec. 24, 1986 | [JP] | Japan | 61-313570 |
| Dec. 24, 1986 | [JP] | Japan | 61-313571 |
| Dec. 24, 1986 | [JP] | Japan | 61-313572 |

[51] Int. Cl.⁵ .................. B60N 1/06; F16H 19/04; F16D 27/12
[52] U.S. Cl. ..................... 192/20; 74/664; 74/665 F; 74/665 GA; 192/48.2; 192/48.91; 192/84 AA
[58] Field of Search .............. 192/0.02 R, 0.098, 20, 192/48.2, 48.91, 82 P, 84 AA, 84 AB; 74/664, 665 F, 665 GA, 665 GB, 665 GC, 849; 310/40.5; 318/4, 115

[56] References Cited

U.S. PATENT DOCUMENTS

| 2,271,207 | 1/1942 | Rhein | 318/4 |
| 2,965,208 | 12/1960 | Forster et al. | 74/813 |
| 3,073,180 | 1/1963 | Lohr | 74/665 GA |
| 3,406,795 | 10/1968 | Pickles | 192/0.02 R |
| 3,547,240 | 12/1970 | Hopler | 192/84 AA |
| 3,686,974 | 8/1972 | Little Jr. | 74/665 GA |
| 4,208,619 | 6/1980 | Delebecque et al. | 318/4 |
| 4,284,935 | 8/1981 | March et al. | 318/280 |

FOREIGN PATENT DOCUMENTS

| 63-159151 | 7/1988 | Japan . |
| 63-159152 | 7/1988 | Japan . |
| 63-159153 | 7/1988 | Japan . |
| 63-159154 | 7/1988 | Japan . |
| 63-162348 | 7/1988 | Japan . |
| 63-163057 | 7/1988 | Japan . |

Primary Examiner—Rodney H. Bonck
Attorney, Agent, or Firm—Armstrong, Nikaido, Marmelstein, Kubovcik & Murray

[57] ABSTRACT

A power transmitting apparatus for use in a vehicle, provided with a motor having at least one output shaft to which a traveling electromagnetic clutch and at least one power-transmitting electromagnetic clutch are attached, a plurality of clutch plates capable of being connected to the power-transmitting electromagnetic clutch while being aligned therewith, and operating shafts fixed to the clutch plates. The power-transmitting electromagnetic clutch is moved by the operation of the traveling electromagnetic clutch and the rotation of the motor to a position at which the power-transmitting clutch can be connected to one of the clutch plates selected as desired.

6 Claims, 9 Drawing Sheets

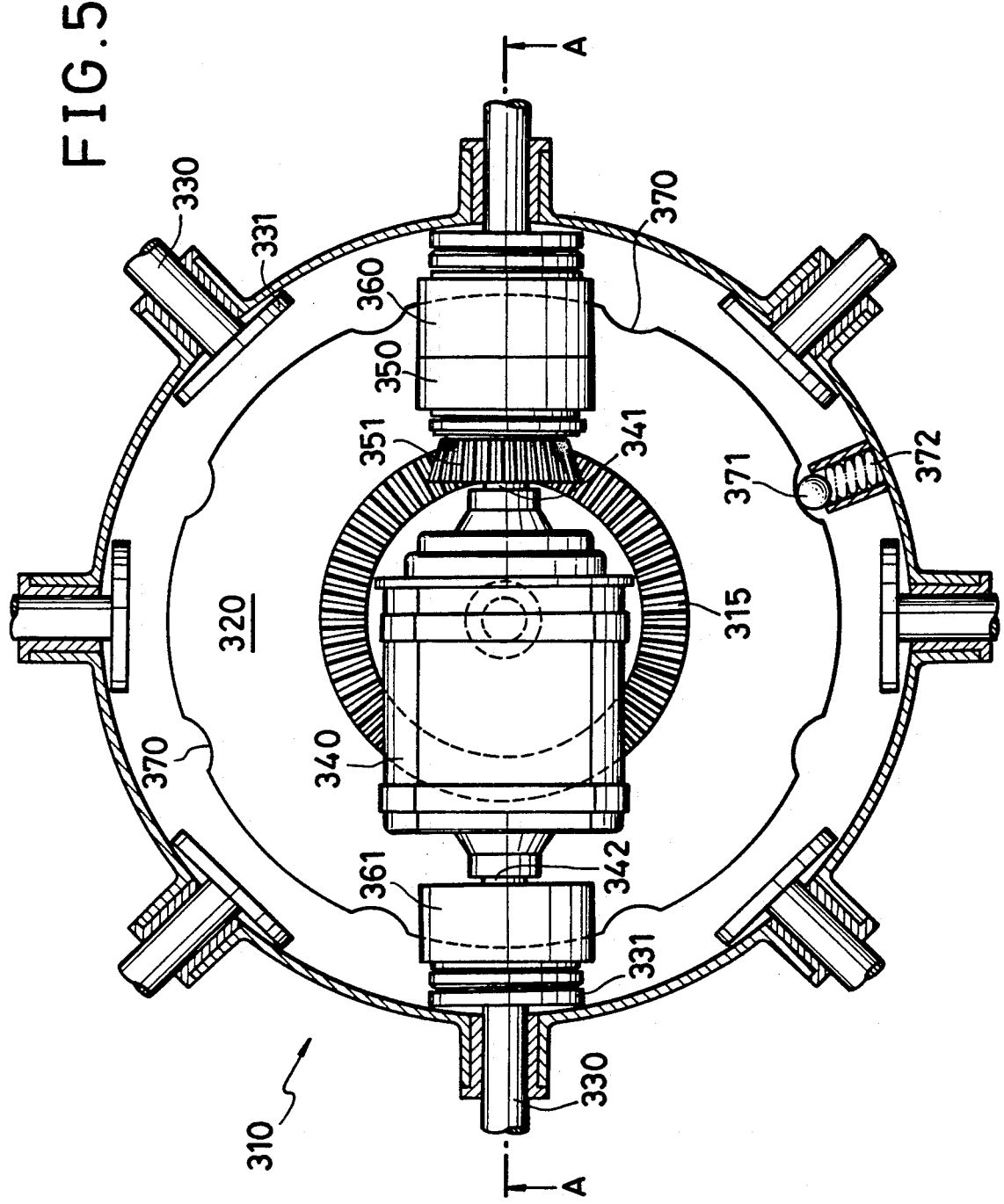

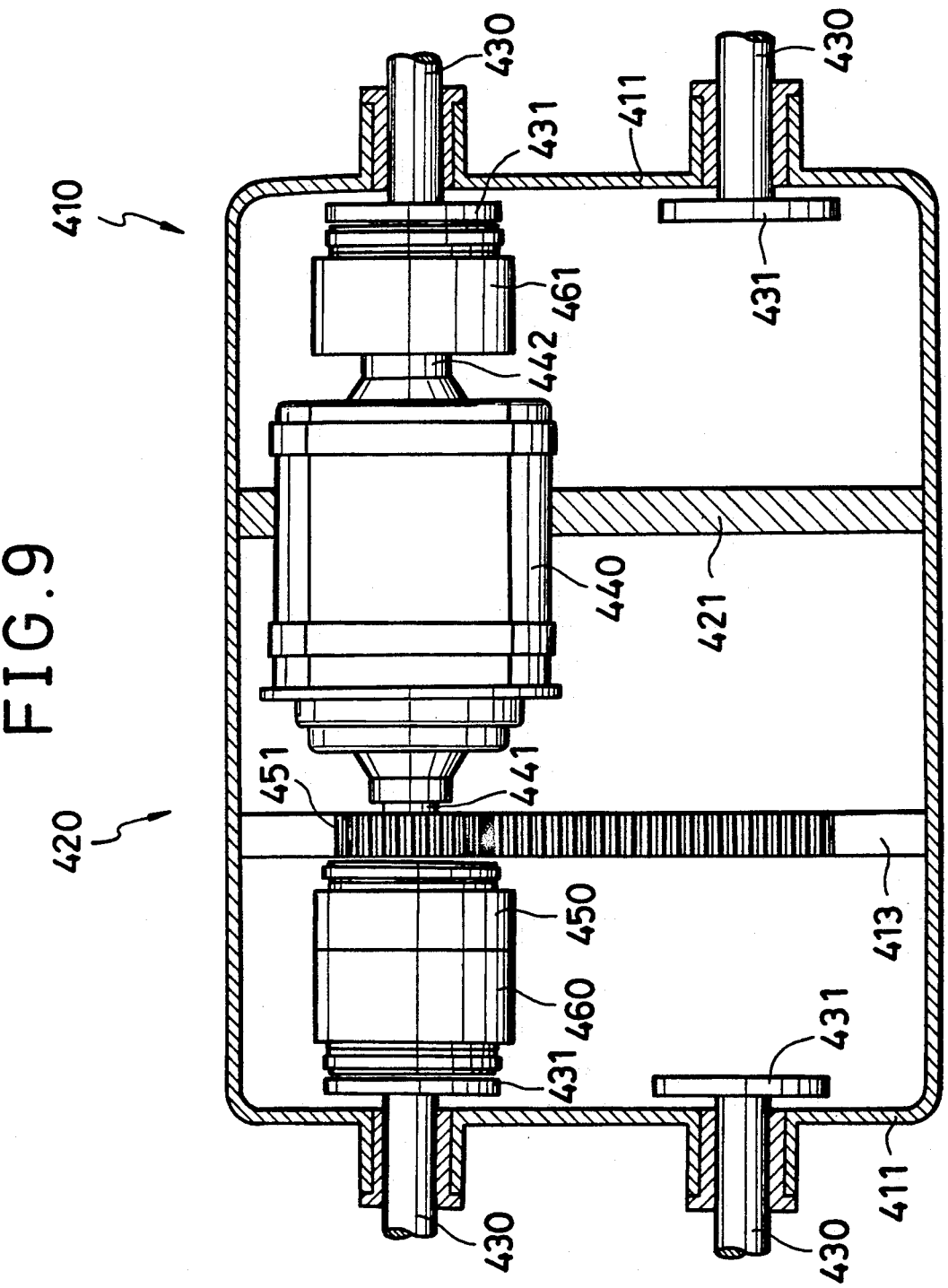

POWER TRANSMITTING APPARATUS FOR USE IN VEHICLE

This application is a continuation-in-part of application Ser. No. 135,948 filed Dec. 21, 1987, and now abandoned.

BACKGROUND OF THE INVENTION

This invention relates to a power transmitting apparatus for use in a vehicle and, more particularly, to an apparatus capable of transmitting power from a motor to a plurality of operating shafts and specifically suitable for application to an apparatus for adjusting the height or angle of a seat for use in a vehicle.

Various types of power transmitting apparatus have been heretofore proposed.

In a power transmitting apparatus which moves a predetermined object to a predetermined position on an X-Y table by transmitting power to two shafts perpendicular to each other, independent motors which are adapted for operations with respect to X- and Y-axes are used to move the object.

For adjustment of a seat for use in a vehicle, an apparatus has been proposed which is capable of adjusting the reclining angle of the seat, moving the seat toward the front or rear of the vehicle, and moving the front end of the seat in the vertical direction all in electrically driving manners.

To provide such three moving means in the conventional type of apparatus for moving the vehicle seat, however, three motors each capable of rotating in normal and reverse directions are used to adjust the seat by moving it in a predetermined direction by a predetermined angle or to a predetermined height.

For a rear-view mirror attached to a door of a latest type of vehicle, an apparatus for adjusting the angle of the rear-view mirror by using a motor is provided. It is necessary for this type of apparatus to adjust angles of the rear-view mirror in the vertical and horizontal directions. A pair of apparatuses of this type are used to move two rear-view mirrors which are disposed on the right- and left-hand sides of the driver's seat. Therefore, four motors each capable of rotating in normal and reverse directions and adpated for adjusting the mirrors are needed for one vehicle.

Various power transmitting apparatuses heretofore used thus need a number of motors that corresponds to a predetermined number of operations which need to be performed, resulting in increases in the size and weight of the apparatus as well as the probability of malfunctions.

In a conventional apparatus designed in consideration of this problem, a plurality of operating shafts are selectively rotated by using only one motor.

An example of this type of apparatus is constructed such that a plurality of gears are successively connected to a gear which is fixed to an output shaft of a motor; an operating shaft is connected to each of the plurality of gears; and a clutch is interposed between each of corresponding pairs of the gears and operating shafts. In this apparatus, one of the operating shafts to be rotated is selected by operating the clutches.

This arrangement makes it possible to perform desired operation by using only one motor, but it uses an increased number of clutches and increases the size and weight of the apparatus as well as the probability of malfunctions. Also there is a problem of power loss between the plurality of gears.

In another example, a motor or an intermediate gear which is connected to an output shaft of the motor is moved by manual operation so as to select one of the plurality of operating shafts and enable the power to be transmitted.

However, such a means necessitates the troublesome operation of manually selecting the operating shafts, and therefore increases the possibility of selection errors. Moreover, the use of the intermediate gear creates a direction in which the motor or the output shaft of the motor moves more difficult, depending upon the direction in which the motor rotates, or it causes power loss.

SUMMARY OF THE INVENTION

It is therefore an object of the present invention to eliminate various defects of conventional power-transmitting mechanism by attaching two electromagnetic clutches to one motor, selecting a clutch plate to be supplied with torque by one of the electromagnetic clutches, and transmitting a torque to the selected clutch plate by the operation of the other electromagnetic clutch, thereby enabling a plurality of operations to be performed by one motor and two electromagnetic clutches.

It is another object of the present invention to prevent power loss by directly connecting a power-transmitting electromagnetic clutch and a clutch plate while aligning these members.

To these ends, the present invention provides a power transmitting apparatus for use in a vehicle, provided with a motor having at least one output shaft to which a traveling electromagnetic clutch and at least one power-transmitting electromagnetic clutch are attached, a plurality of clutch plates capable of being connected to the power-transmitting electromagnetic clutch while being aligned therewith, and operating shafts fixed to the clutch plates, in which the power-transmitting electromagnetic clutch is moved by the operation of the traveling electromagnetic clutch and the rotation of the motor to a position at which the power-transmitting clutch can be connected to one of the clutch plates selected as desired.

In the arrangement in accordance with the present invention, the traveling electromagnetic clutch is actuated while the motor rotates. The motor, that has an output shaft to which the traveling electromagnetic clutch and the power-transmitting electromagetic clutch are fixed, is thereby moved.

After the power-transmitting electromagnetic clutch has been moved to a position at which it can be connected to a desired clutch plate, the traveling electromagnetic clutch is disconnected, thereby stopping the motor whose output shaft is connected to the traveling and power-transmitting electromagnetic clutches.

The power-transmitting electromagnetic clutch is thereafter actuated, so that the torque of the motor is transmitted to the clutch plate that faces the power-transmitting electromagnetic clutch.

Therefore, the single motor has both the functions of traveling to a predetermined position and transmitting power, which can be changed over only by selecting the electromagnetic clutch to be operated.

Therefore, the present invention is free from increase in the weight of the apparatus resulting from increase in the size of the apparatus, reduces the probability of malfunctions, and eliminates power loss due to the use of an intermediate gear since it does not necessarily use such gear.

BRIEF DESCRIPTION OF THE DRAWINGS

FIG. 1 is a plan view;

FIG. 2 is a cross-sectional view taken along a line A—A in FIG. 1;

FIG. 3 is a partial plan view;

FIG. 4 is a partial cross-sectional view taken along a line A—A in FIG. 3;

FIG. 5 is a plan view;

FIG. 6 is a cross-sectional view taken along a line A—A in FIG. 5;

FIGS. 7, 8, and 9 show a further embodiment of the present invention which is provided with two power-transmitting electromagnetic clutches which are rotated like a chamber of a revolver by the operation a motor and a traveling electromagnetic clutch;

FIG. 7 is a plan view;

FIG. 8 is a side view; and

FIG. 9 is a cross-sectional view of an example in which a speed-reduction motor is used.

DESCRIPTION OF THE PREFERRED EMBODIMENTS

Different embodiments of the present invention will be described below with reference to accompanying drawings.

Figure 1:
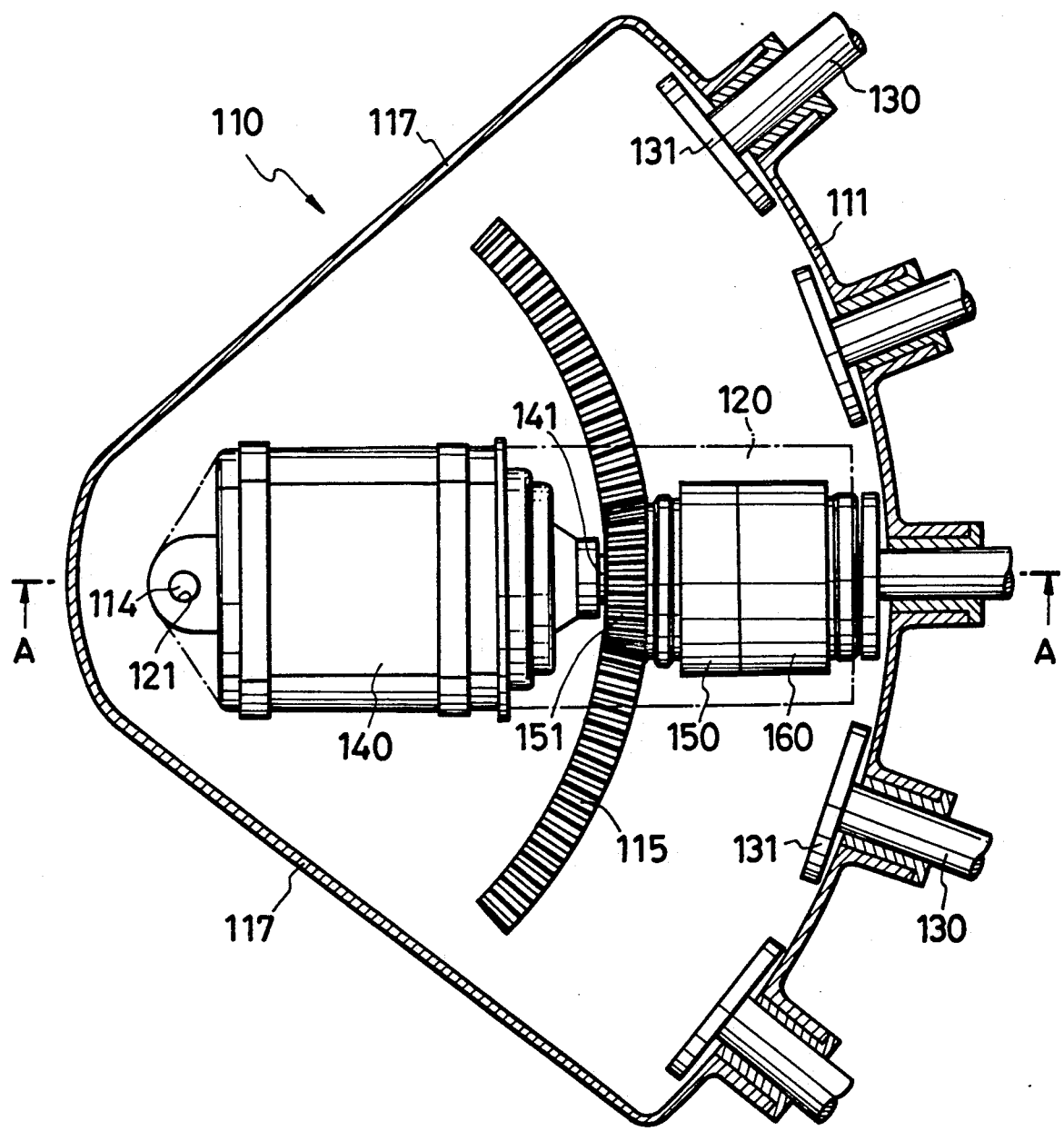
FIGS. 1 and 2 show an embodiment of the present invention which is provided with only one power-transmitting electromagnetic clutch.
Figure 2:
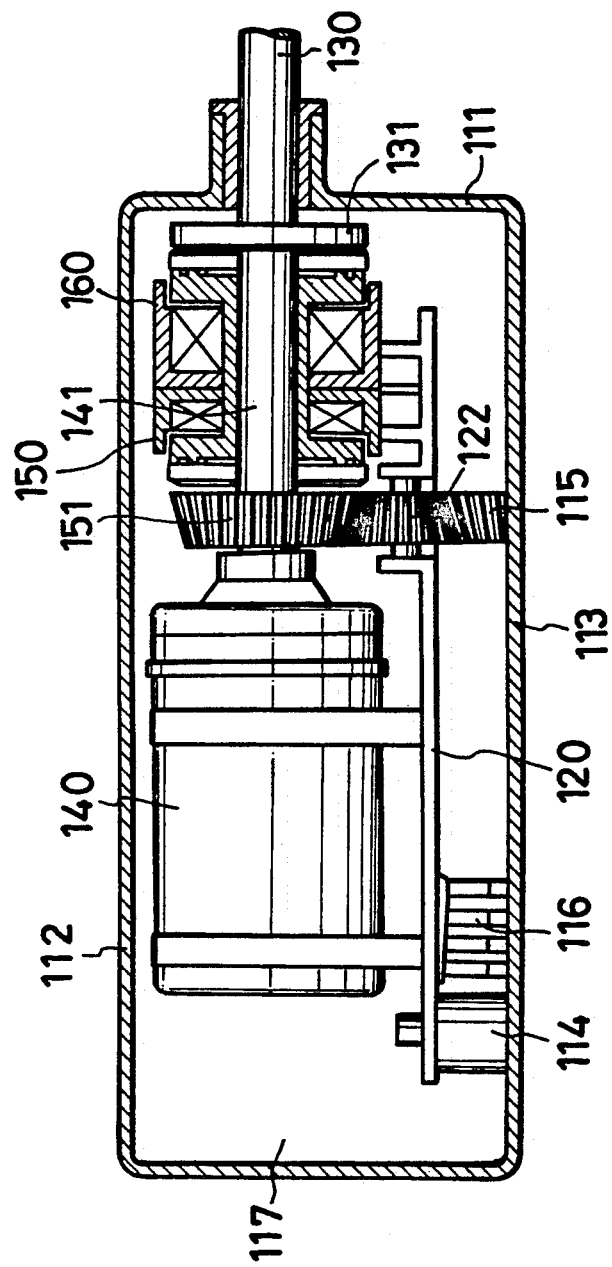

FIGS. 1 and 2 show an embodiment of the present invention which makes use of only one power-transmitting electromagnetic clutch 160. FIG. 1 is a plan view and FIG. 2 is a cross-sectional view taken along the line A—A in FIG. 1.

In this embodiment, a rotary body 120 is housed in a base frame 110 which is sectoral in plan, and clutch plates 131 having outwardly extending operating shafts 130 are operably mounted on a curved plate 111 of the base frame 110 in such a manner that they are disposed at equal angles along the curved plate 111 and are at equal distances from a support shaft 114 about which the rotary body 120 rotates.

The base frame 110 is provided in the form of a sectoral prism closed at its top and bottom, and is constituted by an upper plate 112, a bottom plate 113, the curved plate 111, and a pair of straight plates 117. The support shaft 114 that rotatably supports the rotary body 120 is formed near the point of intersection of the pair of straight plates 117. A tapered rack gear 115, which extends along an arc centered on the support shaft 114, is fixed to the bottom plate 113. Terminals 116 for connection to a power source extend from a left-hand portion of the bottom plate 113 to the rotary body 120, as shown in FIG. 2.

The rotary body 120 has a through shaft hole 121 by which the rotary body 120 is operably and axially supported by the support shaft 114, and a tapered intermediate gear 122 and a disc-type transmitting gear 123 which are operably and axially supported in a position corresponding to the rack gear 115 fixed to the base frame 110. A motor 140 is fixed to the upper surface of the rotary body 120, and a traveling electromagnetic clutch 150 and a power-transmitting electromagnetic clutch 160 are operably attached in sequence to an output shaft 141 of the motor 140 so as to allow the operable connection of the motor output shaft 141 to the tapered pinion gear 151 when the traveling electromagnetic clutch 150 is actuated. In other words, the motor output shaft 141, the traveling electromagnetic clutch 150 and the tapered pinion gear 151 are operably connected so as to permit the motor output shaft 141 to drive the tapered pinion gear 151 upon the actuation of the traveling electromagnetic clutch 150. Thus, the traveling electromagnetic clutch 150, as is typical for a clutch for engaging a driven member with a driving force, operably joins the driving motor output shaft 141 to a driven pinion gear 151.

Consequently, the traveling electromagnetic clutch 150 is adapted to transmit torque from the output shaft 141 of the motor 140 to a gear 151 which meshes with the transmitting gear 123. The torque of the motor 140 is transmitted to the gear 151 by actuating the traveling electromagnetic clutch 150, and the gear 151 is released by disconnecting the traveling electromagnetic clutch 150. Therefore, if the traveling electromagnetic clutch 150 is actuated, the electromagnetic clutch 150 operably connects the motor output shaft 141 to the tapered pinion gear 151 so that the torque of the motor 140 is successively transmitted to the gear 151, the transmitting gear 123, the intermediate gear 122, and the rack gear 115, so that, as a result, the rotary body 120 rotates about the support shaft 114 in the manner of reaction, since the rack gear 115 is fixed to the base frame 110. The travelling electromagnetic clutch 150 and the power-transmitting electromagnetic clutch 160 are conventional, and can be the types manufactured by, for example, Ogura Clutch Co., Ltd., of Kiryu-city, Gunma, Japan.

The power-transmitting electromagnetic clutch 160 as is typical for a clutch for engaging a driven member with a driving force, is used in such a manner that it is actuated and connected to one of the clutch plates 131 facing the power-transmitting clutch 160 having the motor output shaft 141 operably connected to it so as to transmit the torque of the motor 140 by way of the motor output shaft to this clutch plate 131 when the rotary body 120 is stopped along its path on the fixed rack gear 115 at a predetermined position. The clutch plate 131 is released by disconnecting the power-transmitting clutch 160. Therefore, the torque of the motor 140 is transmitted to the corresponding operating shaft 130 via the clutch plate 131 by actuating the power-transmitting clutch 160 and the clutch plate 131.

Next, the operation and functions of a power-transmitting apparatus in accordance with this embodiment will be described.

It is assumed here that the motor 140 and the power-transmitting electromagnetic clutch 160 are in the positions indicated in FIG. 1 before the apparatus starts to operate.

If, in this state, it is necessary to transmit the torque of the motor 140 to one of the operating shafts 130 which is disposed on the right-hand side of the motor 140 as seen in FIG. 1, the power-transmitting electromagnetic clutch 160 is directly actuated without turning the rotary body 120, until it is magnetically connected to the clutch plate 131 on the right-hand side of the clutch 160, thereby enabling the torque of the motor 140 to be transmitted to the operating shaft 130 on the right-hand side thereof. During this operation, the traveling electromagnetic clutch 150 is not connected.

If one of the operating shafts 130 disposed on the upper position is to be operated, the traveling electromagnetic clutch 150 is first actuated and the motor 140 is rotated while the power-transmitting electromagnetic clutch 160 is disengaged, so that the torque of the motor 140 is successively transmitted via the rotation electromagnetic clutch to the gear 151, the transmitting gear 123, the intermediate gear 122, and the rack gear 115, thereby making the rotary body 120 rotate about the support shaft 114. When, during this rotation, the power-transmitting electromagnetic clutch 160 ends up in front of the selected clutch plate 131, the traveling electromagnetic clutch 150 is disconnected so that the power-transmitting electromagnetic clutch 160 is made to face the selected clutch plate 131 shown near the top of FIG. 1.

When the traveling electromagnetic clutch 150 is disconnected, the gear 151 is released relative to the rotation of the motor 140. At this point, the power-transmitting electromagnetic clutch 160 is actuated so that it is magnetically connected to the selected clutch plate 131, thereby enabling the torque of the motor 140 to be transmitted to that clutch plate 131.

If, in this state, the motor 140 rotates, the torque of the motor 140 is transmitted via the power-transmitting electromagnetic clutch 160 and the clutch plate 131 to the operating shaft 130 fixed to the selected clutch plate 131.

If, as a result of rotating the operating shaft 130 by transmitting the torque of the motor 140 to the operating shaft 130, the rotation of the operating shaft 130 is larger than a suitable value, in other words, if a connected member has been moved too far, the motor 140 may be rotated in the opposite direction while the power-transmitting electromagnetic clutch 160 and the clutch plate 131 are still magnetically connected to each other, thereby adjusting the extent of movement.

The torque of the motor 140 can also be transmitted to the other clutch plates 131 shown in FIG. 1 in a simple manner. That is, the rotary body 120 can be rotated about the support shaft 114 in a similar manner and the power-transmitting electromagnetic clutch 160 is thereafter magnetically connected to the clutch plate 131 at a predetermined position.

The direction in which the rotary body 120 rotates is determined by the direction of rotation of the motor 140.

In this embodiment, the motor 140 and two electromagnetic clutches are fixed to the rotary body 120, thereby enabling the torque of the single motor 140 to be transmitted to one of five operating shafts 130 adapted for different operations.

Since, in this embodiment, the rotary body 120 is rotated by the traveling electromagnetic clutch 150, there is no need to provide another power source for rotating the rotary body 120.

This embodiment exemplifies the case in which five clutch plates 131 are disposed at equal pitch. However, the pitch and number of the clutch plates can be selected as desired.

The power-transmitting electromagnetic clutch 160 can prevent overloading of the motor 140 in such a manner that it slides if the operating shaft 130 becomes overloaded because of an interruption to the movement of the mechanism caused by, for example, an extraneous body caught on a rail on which a seat moves. Therefore, there is no possibility of the motor 140 becoming damaged by external causes. This can also be said with respect to the traveling electromagnetic clutch 150.

It is preferable to magnetically connect the power-transmitting electromagnetic clutch 160 and each clutch plate 131 when the axes thereof coincide with each other, since the power-transmitting electromagnetic clutch 160 and the clutch plate 131 transmit torque through the connection therebetween. This can be enabled by stopping the rotation of the rotary body 120 at a position at which the axes of the power-transmitting electromagnetic clutch 160 and the desired clutch plate coincide with each other. If it is technically difficult to accurately determine the position of the clutch, the contact surfaces of the power-transmitting electromagnetic clutch 160 and the clutch plate 131 may be formed such that one of them is convex cone and the other has a complementary concave form, thereby enabling the power-transmitting electromagnetic clutch 160 and the clutch plate 131 to be aligned with each other when the clutch 160 is actuated.

In the illustrated example, the rotary body 120 is in the form of a plate, but it may be formed otherwise, or it may be provided as a frame. The rotary body 120 may have any form, so long as it can rotate about the support shaft 114 while securely supporting the motor 140.

In the illustrated example, the output shaft 141 is shown as the rotary shaft of the motor 140 itself, but the output shaft in accordance with the present invention could comprise an output shaft of a speed reducer if a speed-reduction motor is used.

Figure 3:
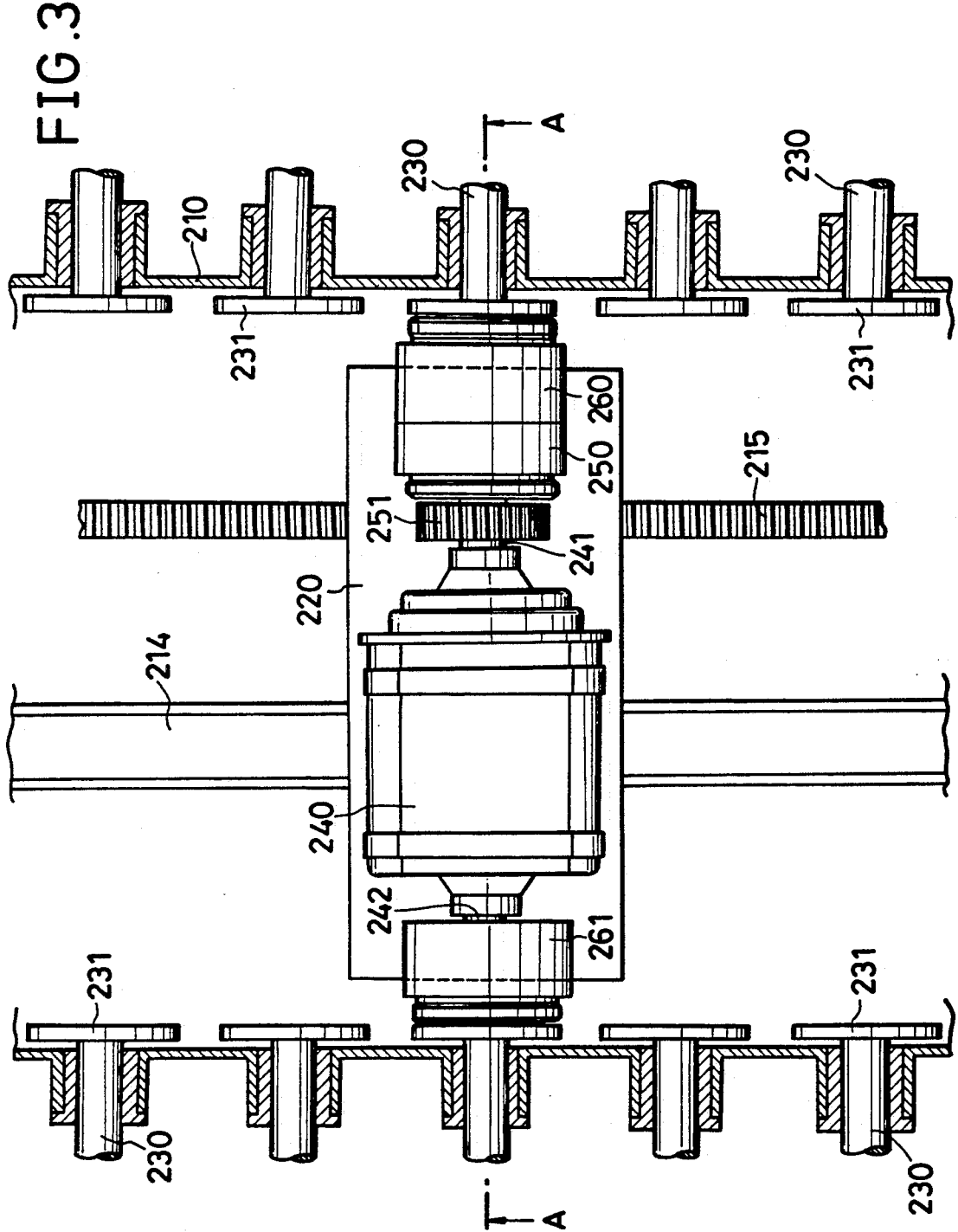
FIGS. 3 and 4 show another embodiment of the present invention which is provided with two power-transmitting electromagnetic clutches which are linearly moved by the operation a motor and a traveling electromagnetic clutch.
Figure 4:
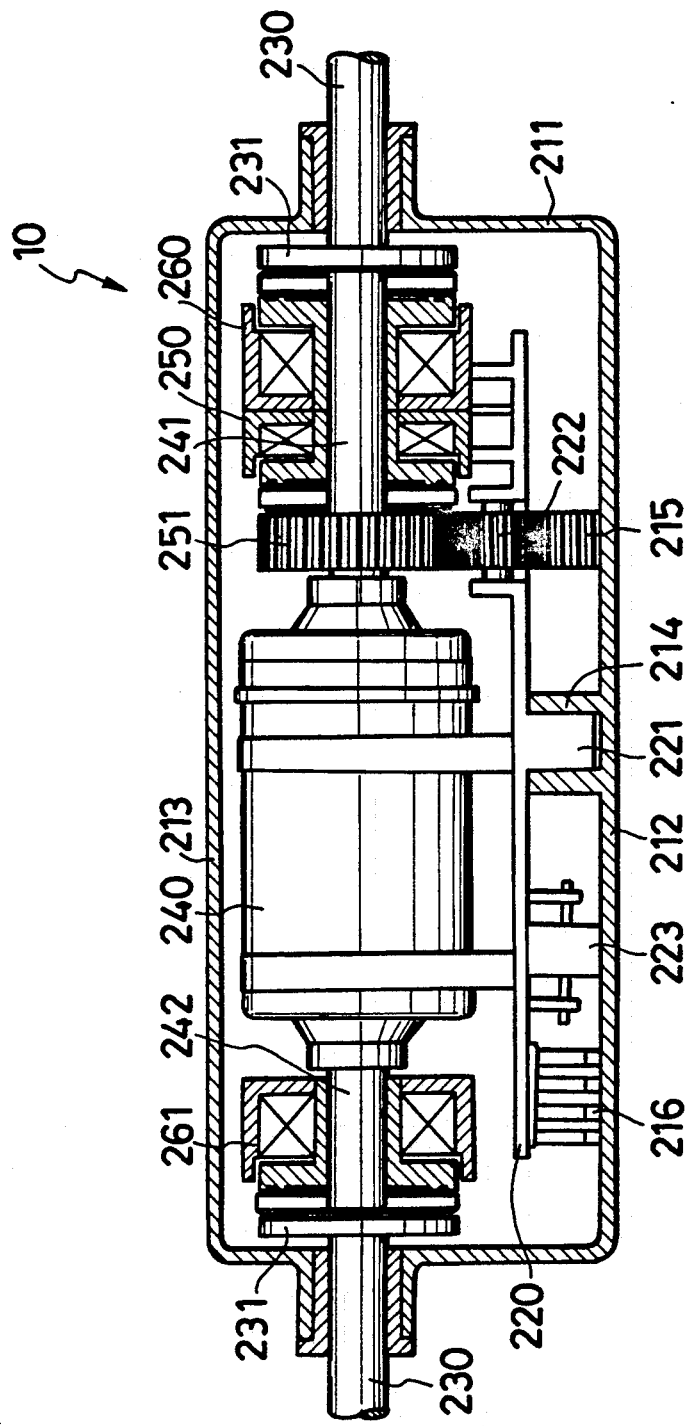

An embodiment shown in FIGS. 3 and 4 is provided with two power-transmitting electromagnetic clutches 260 and 261 and is adapted to provide a straight-line movement by the action of a motor 240 and a traveling electromagnetic clutch 250. FIG. 3 is a plan view and FIG. 4 is a cross-sectional view taken along the line A—A of FIG. 3.

In this embodiment, a traveling body 220 is disposed inside a base frame 210, and clutch plates 231 having outwardly extending operating shafts 230 are axially supported in side plates 211 disposed on opposite sides of the base frame 210 along the direction in which the traveling body 220 travels.

The base frame 210 is provided in the form of a rectangular prism closed at its top and bottom, and is constituted by an upper plate 212, a bottom plate 213, and side plates 211. A guide channel 214 for linearly moving the traveling body 220 is formed in the bottom plate 213 of the base frame 210 along the center line thereof. A straight rack gear 215 is formed on one side of the guide channel 214 along the direction in which the traveling body 220 travels. Terminals 216 for connection to a power source extend from a left-hand portion of the bottom plate 213 to the traveling body 220, as shown in FIG. 4.

The traveling body 220 has a guide 221 which downwardly extends from a central portion of the traveling body and which is supported by the guide groove 214 of the base frame 210, and an intermediate gear 222 which is axially supported in a position corresponding to the rack gear 215 disposed on the base frame 210. A roller 223 for facilitating the traveling of the traveling body 220 is attached to the bottom side of the traveling body 220 in a position opposite to the intermediated gear 222 relative to the guide 221. A motor 240 which can rotate in normal and reverse directions is fixed to the upper surface of the traveling body 220. The traveling electromagnetic clutch 250 and the first power-transmitting electromagnetic clutch 260 are attached in sequence to a first output shaft 241 of the motor 240, and the second power-transmitting electromagnetic clutch 261 is attached to a second output shaft 242 of the motor 240.

The traveling electromagnetic clutch 250 is adapted to transmit the torque of the motor 240 from the first output shaft 241 to a pinion gear 251 which meshes with the intermediate gear 222. The torque of the motor 240 is transmitted to the pinion gear 251 by actuating the traveling electromagnetic clutch 250, and the pinion gear 251 is released by disconnecting the traveling electromagnetic clutch 250. Therefore, if the traveling electromagnetic clutch 250 is actuated, the torque of the motor 240 is successively transmitted to the pinion gear 251, the intermediate gear 222, and the rack gear 215, so that, as a result, the traveling body 220 travels in the manner of reaction since the rack gear 215 is fixed to the base frame 210.

The first or second power-transmitting electromagnetic clutch 260 or 261 is used in such a manner that it is actuated and connected to one of the clutch plates 231 facing the first or second power-transmitting clutch 260 or 261 so as to transmit the torque of the motor 240 to this clutch plate 231 when the traveling body 220 is stopped at a predetermined position. The clutch plate 231 is released by disconnecting the power-transmitting clutch 260 or 261 which has been actuated. Therefore, the torque of the motor 240 is transmitted to the corresponding operating shaft 230 via the clutch plate 231 by actuating the power-transmitting clutch 260 or 261.

If the arrangement is such that the axes of the output shafts 241 and 242 of the motor 240 are aligned with each other and the clutch plates 231 are disposed on the opposite sides of the traveling body 220 along the traveling direction of the traveling body 220 so as to face each other, as shown in FIG. 3, either of the first and second power-transmitting electromagnetic clutches 260 and 261 face the clutch plates 231 when the traveling body 220 stops. Therefore, in this arrangement, torques in opposite directions can be simultaneously transmitted to the clutch plates 231 facing each other by simultaneously actuating the first and second power-transmitting electromagnetic clutches 260 and 261.

In this arrangement, it is, of course, possible to rotate only one clutch plate 231 by actuating one of the first and second power-transmitting electromagnetic clutches 260 and 261.

Next, the operation and functions of a power-transmitting apparatus in accordance with this embodiment will be described.

It is assumed here that the motor 240 and the first power-transmitting electromagnetic clutch 260 are in the positions indicated in FIG. 3 before the apparatus starts to operate, and that the rotation output from the first power-transmitting electromagnetic clutch 260 is normal rotation and the rotation output from the second power-transmitting transmitting electromagnetic clutch 261 is reverse rotation.

If, in this state, it is necessary to transmit the torque of the motor 240 as normal rotation to one of the operating shafts 230 which is disposed at the right-hand side of FIG. 3, the first power-transmitting electromagnetic clutch 260 is directly actuated without moving the traveling body 220, until it is magnetically connected to the clutch plate 231 on the right-hand side of the clutch 260, thereby enabling the torque of the motor 240 in the normal direction to be transmitted as normal rotation to the operating shaft 230 on the right-hand side thereof. During this operation, the traveling electromagnetic clutch 250 is not connected. If, at this time, the motor 240 is rotated in the reverse direction, torque in the reverse direction is transmitted to the operating shaft 230 on the right-hand side.

It is therefore possible to alternately rotate the same operating shaft 230 by changing the rotating direction of the motor 240 as desired so as to enable a member connected to the operating shaft 230, for example, a seat to be suitably adjusted by being moved in the direction in which the vehicle travels.

In the above-described state of the apparatus, the second power-transmitting clutch 261 also faces one of the clutch plates shown at the left-hand side of FIG. 3. To transmit torque to the clutch plate 231 shown at the right-hand side of FIG. 3 alone, only the first power-transmitting electromagnetic clutch 260 is actuated, but, if it is necessary to simultaneously transmit torques in opposite directions to the clutch plate 231 shown at the left-hand side of FIG. 3, the second power-transmitting electromagnetic clutch 261 is actuated together with the first power-transmitting electromagnetic clutch 260 so as to transmit torques in opposite directions from the motor 240 to two operating shafts 230 in the opposite direction.

In this case, it is, of course, possible to actuate the second power-transmitting electromagnetic clutch 261 alone so as to output torque to the left-hand operating shaft 230 only.

If one of the operating shafts 230 disposed on the upper position relative to those shown in FIG. 3 is to be operated by transmitting a torque in the normal direction to this operating shaft 230 via the first power-transmitting electromagnetic clutch 260, the traveling electromagnetic clutch 250 is first actuated and the motor 240 is rotated while the first and second power-transmitting electromagnetic clutches 260 and 261 are disengaged so that the torque of the motor 240 is successively transmitted via the traveling electromagnetic clutch 250 to the pinion gear 251, the intermediate gear 222, and the rack gear 215, thereby making the traveling body 220 travel upward, as viewed in FIG. 3. When, during this traveling, the first power-transmitting electromagnetic clutch 260 ends up in front of the selected clutch plate 231, the traveling electromagnetic clutch 250 is disconnected so that the first power-transmitting electromagnetic clutch 260 is made to face the selected clutch plate 231 at the predetermined position.

When the traveling electromagnetic clutch 250 is disconnected, the pinion gear 251 is released relative to the rotation of the motor 240. At this point, the first power-transmitting electromagnetic clutch 260 is actuated so as that it is magnetically connected to the clutch plate 231 at the predetermined position, thereby enabling the torque of the motor 240 to be transmitted as normal-direction rotation to that clutch plate 231 shown near the top of FIG. 3.

If, in this state, the motor 240 rotates, a normal-direction torque of the motor 240 is transmitted via the first power-transmitting electromagnetic clutch 260 and the clutch plate 231 to the operating shaft 230 near the top of FIG. 3 as a normal-direction torque thereof.

If, at the same time, the same rotation of the motor 240 is transmitted to the clutch plate 231 that faces the second power-transmitting electromagnetic clutch 261, a torque in the direction opposite to that transmitted to the clutch plate 231 via the first power-transmitting electromagnetic clutch 260 is transmitted to the left-hand clutch plate 231.

The torque of the motor 240 can also be transmitted to one of the other clutch plates 231 shown in FIG. 3 in a simple manner. That is, the traveling body 220 can be moved to a position corresponding to the clutch plate 231 at a predetermined position in the vertical direction by selecting the normal or reverse rotation of the motor 240, and the first or second power-transmitting electromagnetic clutch 260 or 261 is magnetically connected to the clutch plate 231 at the predetermined position.

In this embodiment, the normal-reverse-rotation motor 240 and two power-transmitting electromagnetic clutches 260 and 261 are fixed to the traveling body 220, thereby enabling the torque of the single motor 240 to be transmitted to one of ten operating shafts 230 adapted for different operations independently of the direction in which the motor rotates.

Since, in this embodiment, the traveling body 220 is moved by the traveling electromagnetic clutch 250, there is no need to provide another power source for moving the rotary body 220.

In this embodiment, the intermediate gear 222 is used to transmit torque from pinion gear 251 to the rack gear 215, but other arrangements which do not use the intermediate gear 222 are also possible.

This embodiment exemplifies the case in which ten clutch plates 31 which face each other are disposed on the opposites sides of the base frame along the direction in which the motor 240 is moved. However, the number of clutch plates can be selected as desired. It is also possible to omit one of the power-transmitting electromagnetic clutches 260 and 261 and dispose the clutch plates 231 in positions corresponding to one of the power-transmitting electromagnetic clutches 260 and 261 provided, in other word, dispose the clutch plates 231 on one of the side plates shown in FIG. 3.

If the power-transmitting electromagnetic clutch 260 and 261 are non-contact electromagnetic clutches, they can prevent overloading of the motor 240 in such a manner that they slide if the operating shafts 230 become overloaded because of an interruption to the movement of the mechanism caused by, for example, an extraneous body caught on a rail on which a seat moves. Therefore, there is no possibility of the motor 240 becoming damaged by external causes. This can also be said with respect to the traveling electromagnetic clutch 250.

It is preferable to enable the axes of the power-transmitting electromagnetic clutches 260 and 261 and the clutch plates 231 to coincide with each other, since these members transmit torques through the connection therebetween. This can be enabled by stopping the rotation of the traveling body 220 at a position at which the axes of the power-transmitting electromagnetic clutches 260 and 261 and the desired clutch plate coincide with each other. If it is technically difficult to accurately position the clutches, the contact surfaces of the power-transmitting electromagnetic clutch 260 or 261 and the corresponding clutch plate 231 may be formed such that one of them is convex cone and the other has a complementary concave form, thereby enabling the power-transmitting electromagnetic clutch 260 or 261 and the clutch plate 231 to be aligned with each other when the clutch 260 or 261 is actuated.

In the illustrated example, the rotary body 220 is in the form of a plate, but it may be formed otherwise, or it may be provided as a frame. The rotary body 220 may have any form, so long as it can move straight while securely supporting the motor 240.

In the illustrated example, the output shaft 241 is shown as the rotary shaft of the motor 240 itself, but the output shaft in accordance with the present invention could comprise an output shaft of a speed reducer if a speed-reduction motor is used.

Figure 6:
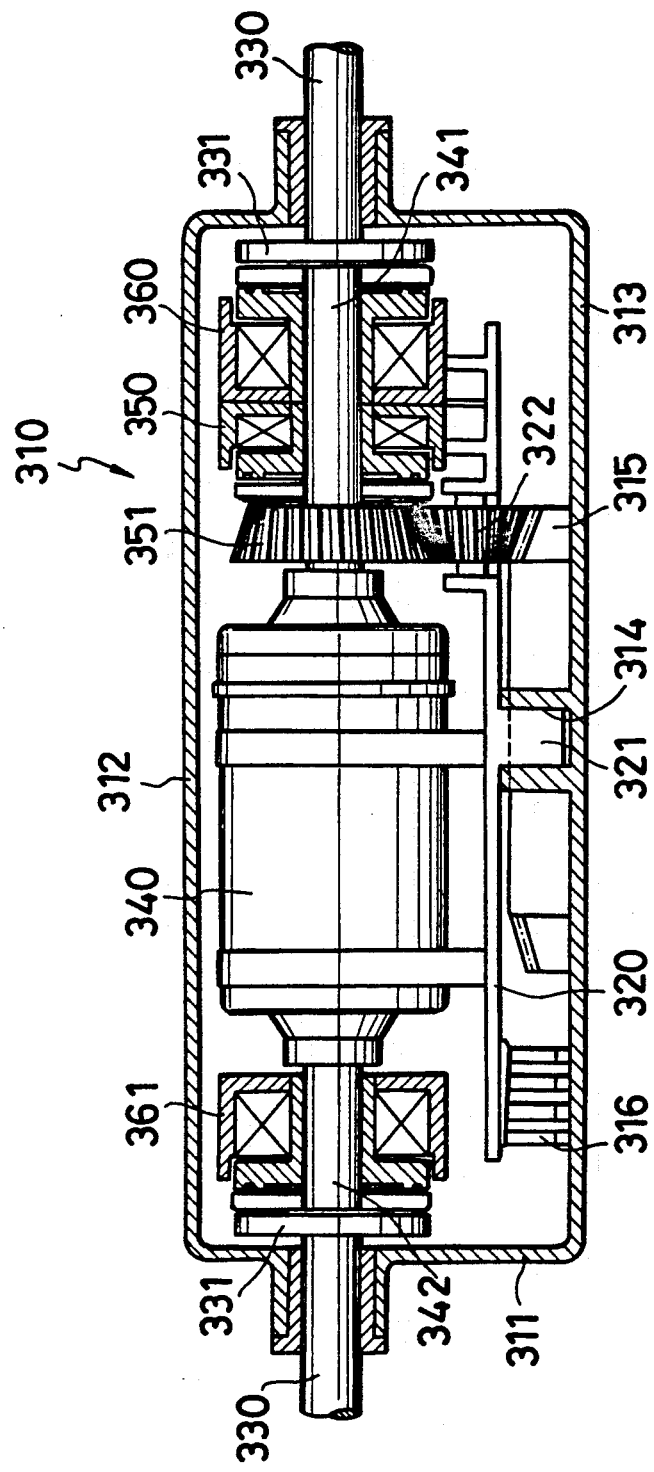
FIGS. 5 and 6 show still another embodiment of the present invention which is provided with two power-transmitting electromagnetic clutches which are rotated on a plane by the operation a motor and a traveling electromagnetic clutch.
Figure 5:
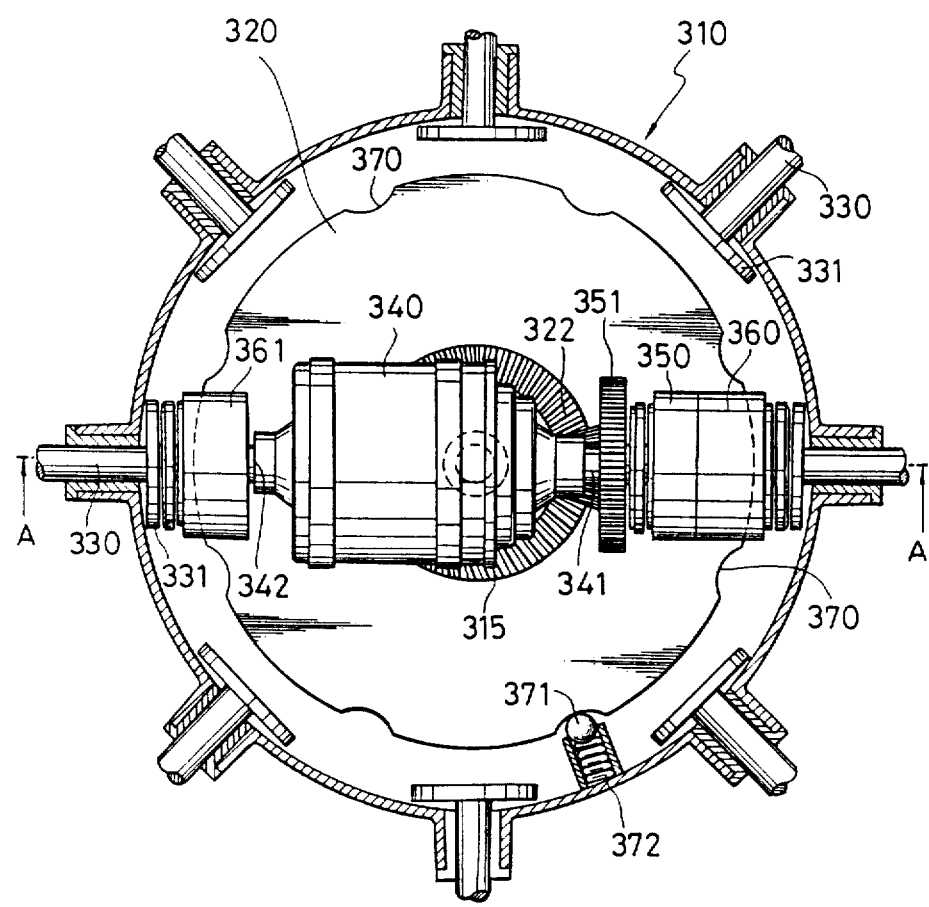
Figure 6:
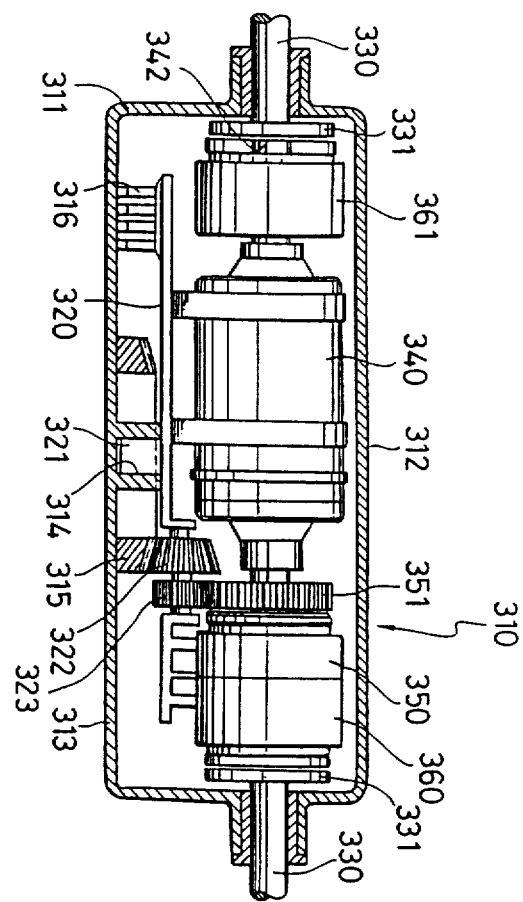

An embodiment shown in FIGS. 5 and 6 which is provided with two power-transmitting electromagnetic clutches 360 and 361 and is adapted to provide a rotation on a plane by the action of a motor 340 and a traveling electromagnetic clutch 350. FIG. 5 is a plan view and FIG. 6 is a cross-sectional view taken along the line A—A of FIG. 5.

In this embodiment, a rotary body 320 is disposed inside a base frame 310 at the center thereof, and clutch plates 331 having outwardly extending operating shafts 330 are axially supported in a circumferential plate 311 of the base frame 310 such that they make equal angles relative to the circumferential plate 311 and are equally spaced from the center of rotation of the rotary body 320.

The base frame 310 is provided in the form of a cylinder closed at its top and bottom, and is constituted by an upper plate 312, a bottom plate 313, and the circumferential plate 311. A support hole 314 at which the rotary body 320 is rotatably supported is formed in the bottom plate 313 at the center thereof. A tapered rack gear 315 in the form of a ring whose center coincides with that of the support hole 314 is fixed to a portion of the bottom plate 313 which encircles the support hole 314. Terminals 316 for connection to a power source extend from a left-hand portion of the bottom plate 313 to the rotary body 320, as shown in FIG. 6.

The rotary body 320 has a support shaft 321 which downwardly extends from a central portion of the rotary body and which is supported by the support hole 314 of the base frame 310, and a tapered intermediate gear 322 and a disc-type transmitting gear 323 which are axially supported in a position corresponding to the rack gear 315 disposed on the base frame 310. A motor 340 which rotates in only one direction is fixed to the upper surface of the rotary body 320. The traveling electromagnetic clutch 350 and the first power-transmitting electromagnetic clutch 360 are attached in sequence to a first output shaft 341 of the motor 340, and the second power-transmitting electromagnetic clutch 361 is attached to a second output shaft 342 of the motor 340.

The traveling electromagnetic clutch 350 is adapted to transmit the torque of the motor 340 from the first output shaft 341 to a gear 351 which meshes with the transmitting gear 323. The torque of the motor 340 is transmitted to the gear 351 by actuating the traveling electromagnetic clutch 350, and the gear 351 is released by disconnecting the traveling electromagnetic clutch 350. Therefore, if the traveling electromagnetic clutch 350 is actuated, the torque of the motor 340 is successively transmitted to the gear 351, the transmitting gear 323, the intermediate gear 322, and the rack gear 315, so that, as a result, the rotary body 320 then travels in the manner of reaction since the rack gear 315 is fixed to the base frame 310.

The first or second power-transmitting electromagnetic clutch 360 or 361 is used in such a manner that it is actuated and connected to one of the clutch plates 331 facing the first or second power-transmitting clutch 360 or 361 so as to transmit the torque of the motor 340 to this clutch plate 331 when the rotary body 320 is stopped at a predetermined position. The clutch plate 331 is released by disconnecting the power-transmitting clutch 360 or 361. Therefore, the torque of the motor 340 is transmitted to the corresponding operating shaft 330 via the clutch plate 331 by actuating the power-transmitting clutch 360 or 361.

If the arrangement is such that, as shown in FIG. 6, an even number of the clutch plates 331 are disposed at equal pitches, either of the first and second power-transmitting electromagnetic clutches 360 and 361 face the clutch plates 331 when the rotation of the rotary body 320 is stopped. Therefore, in this arrangement, torques in opposite directions can be simultaneously transmitted to the clutch plates 331 facing each other by simultaneously actuating the first and second power-transmitting electromagnetic clutches 360 and 361. In this arrangement, it is, of course, possible to rotate only one clutch plate 331 by actuating one of the first and second power-transmitting electromagnetic clutches 360 and 361.

In this embodiment, recesses 370 are formed in the outer periphery of the rotary body 320, and stop balls 371 and springs 372 for pressing the stop balls 371 against the recesses 370 are disposed on the circumferential plate 311 of the base frame 310 at positions corresponding to the recesses 370, thereby ensuring that the rotary body 320 stops at desired positions.

Next, the operation and functions of a power-transmitting apparatus in accordance with this embodiment will be described.

It is assumed here that the motor 340 and the first power-transmitting electromagnetic clutch 360 are in the positions indicated in FIG. 5 before the apparatus starts to operate, that the motor 360 can rotate in only one direction, and that the rotation output from the first power-transmitting electromagnetic clutch 360 is normal rotation and the rotation output from the second power-transmitting electromagnetic clutch 361 is reverse rotation.

If, in this state, it is necessary to transmit the torque of the motor 340 as normal rotation to one of the operating shafts 330 which is disposed at the right-hand side of FIG. 5, the first power-transmitting electromagnetic clutch 360 is directly actuated without moving the rotary body 320, until it is magnetically connected to the clutch plate 331 on the right-hand side of the clutch 360, thereby enabling the torque of the motor 340 in the normal direction to be transmitted as normal rotation to the operating shaft 330 on the right-hand side thereof. During this operation, the traveling electromagnetic clutch 350 is not connected.

Also, at this time, the second power-transmitting clutch 361 faces one of the clutch plates shown at the left-hand side of FIG. 5. To transmit torque to the clutch plate 331 at the right-hand side of FIG. 5 alone, only the first power-transmitting electromagnetic clutch 360 is actuated, but, if it is necessary to simultaneously transmit torques in opposite directions to the clutch plate 331 shown at the left-hand side of FIG. 5, the second power-transmitting electromagnetic clutch 361 is actuated together with the first power-transmitting electromagnetic clutch 360 so as to transmit torques in opposite directions from the motor 340 to two operating shafts 330 in the opposite direction.

In this case, it is, of course, possible to actuate the second power-transmitting electromagnetic clutch 361 alone so as to output torque to the left-hand operating shaft 330 only.

If the rotation of the first power-transmitting electromagnetic clutch 360 thereby rotated is in excess, the traveling electromagnetic clutch 350 is actuated and the motor 340 is rotated while the first and second power-transmitting electromagnetic clutches 360 and 361 are disengaged. The torque of the motor 340 is thereby successively transmitted via the traveling electromagnetic clutch 350 to the gear 351, the transmitting gear 323, the intermediate gear 322, and the rack gear 315, thereby rotating the rotary body 320 about the support shaft 321 through 180° in the normal direction and making the second power-transmitting electromagnetic clutch 361 face the clutch plate 331 on the right-hand side. The traveling electromagnetic clutch 350 is thereafter disconnected, and the second power-transmitting electromagnetic clutch 361 is actuated so that it is magnetically connected to the clutch plate 331 at the right-hand side of FIG. 5, thereby enabling rotation in the reverse direction.

It is thus possible to adjust the suitable operating position by actuating the traveling electromagnetic clutch 350 to rotate the rotary body 320 and successively actuating the power-transmitting electromagnetic clutches 360 and 361 so as to rotate the operating shaft 330 in the normal and reverse directions.

If one of the operating shafts 330 which is disposed on the uppermost position is be operated by transmitting torque in the normal direction to this operating shaft 330 via the first power-transmitting electromagnetic clutch 360, the traveling electromagnetic clutch 350 is first actuated and the motor 340 is rotated while the first and second power-transmitting electromagnetic clutches 360 and 361 are disengaged, so that the torque of the motor 340 is successively transmitted via the traveling electromagnetic clutch 350 to the gear 351, the transmitting gear 323, the intermediate gear 322, and the rack gear 315, thereby rotating the rotary body 320 about the support shaft 321 through 90°. When, during this traveling, the first power-transmitting electromagnetic clutch 360 reaches the upper most position and when the stop ball 371 is positioned in the recess 370, the traveling electromagnetic clutch 350 is disconnected so that the first power-transmitting electromagnetic clutch 360 is made to face the clutch plate 331 at the uppermost position, as viewed in FIG. 5.

When the traveling electromagnetic clutch 350 is disconnected, the gear 351 is released relative to the rotation of the motor 340. At this point, the first power-transmitting electromagnetic clutch 360 is actuated so that it is magnetically connected to the clutch plate 331 at the top of FIG. 5, thereby enabling the torque of the motor 340 to be transmitted as normal-direction rotation to the clutch plate 331 at the top of FIG. 5.

If, in this state, the motor 340 rotates, the torque of the motor 340 is transmitted via the first power-transmitting electromagnetic clutch 360 and the clutch plate 331 to the operating shaft 330 at the top of FIG. 5 as a normal-direction torque.

If it is necessary to transmit torque in the reverse direction to the operating shaft 330 in the uppermost position via the second power-transmitting electromagnetic clutch 361, the rotary body 320 is rotated through 270° from the initial position so that the second power-transmitting electromagnetic clutch 361 faces the clutch plate 331 in the uppermost position, the second power-transmitting electromagnetic clutch 361 is thereafter actuated so as to transmit the torque in the reverse direction to the operating shaft 330.

The torque of the motor 340 can also be transmitted to one of the other clutch plates 331 shown in FIG. 5 in a simple manner. That is, the rotary body 320 can be rotated, and the first or second power-transmitting electromagnetic clutch 360 or 361 is magnetically connected to the clutch plate 331 at a predetermined position.

In this embodiment, the one-direction-rotation motor 340 and two power-transmitting electromagnetic clutches 360 and 361 are fixed to the rotary body 320, thereby enabling the torque of the single motor 340 to be transmitted to one of eight operating shafts 330 adapted for different operations independently of the direction in which the motor rotates.

Since, in this embodiment, the rotary body 320 is rotated by the traveling electromagnetic clutch 350, there is no need to provide another power source for moving the rotary body 320.

Next, this embodiment will be described with respect to a case in which the motor 340 is capable of rotating in opposite directions.

In this case, one of the first and second power-transmitting electromagnetic clutches 360 and 361 is made to face the desired clutch plate 331, and one or both of the power-transmitting electromagnetic clutches are actuated so that they are magnetically connected to the corresponding clutch plates 331. Thereafter, torque in the normal or reverse direction can be transmitted to the operating shaft 330 by selecting, as desired, the direction in which the motor 340 rotates.

Therefore, there is no need to provide a step of rotating the rotary body 320 for changing the direction of rotation to be transmitted to the same clutch plate 331, thereby enabling the adjustment to be performed in a short time.

Moreover, the direction in which the rotary body 320 rotates can be inverted since the motor 340 can rotate in the normal and reverse directions. That is, if the direction in which the motor 340 rotates to drive the rotary body 320 is suitably selected, the angle through which the rotary body 320 rotates to move one of the power-transmitting electromagnetic clutches 360 and 361 to the position at which the clutch faces the desired clutch plate can be limited to at most 90°, thereby further reducing the time taken for the adjustment.

This embodiment exemplifies the case in which eight clutch plates 331 are disposed at equal pitch. However, the pitch and number of the clutch plates can be selected as desired.

If the power-transmitting electromagnetic clutches 360 and 361 can prevent overloading of the motor 340 in such a manner that they slide if the operating shafts 330 become overloaded because of an interruption to the movement of the mechanism caused by, for example, an extraneous body caught on a rail on which a seat moves. Therefore, there is no possibility of the motor 340 being damaged by external causes. This can also be said with respect to the traveling electromagnetic clutch 350.

It is preferable to enable the axes of the power-transmitting electromagnetic clutches 360 and 361 and the clutch plates 331 to coincide with each other, since these members transmit torques through the connection therebetween. This can be enabled by stopping the rotation of the rotary body 320 at a position at which the axes of the power-transmitting electromagnetic clutches 360 and 361 and the desired clutch plate coincide with each other. If it is technically difficult to accurately position the clutches, the contact surfaces of the power-transmitting electromagnetic clutch 360 or 361 and the corresponding clutch plate 331 may be formed such that one of them is convex cone and the other has a complementary concave form, thereby enabling the power-transmitting electromagnetic clutch 360 or 361 and the clutch plate 331 to be aligned with each other when the clutch 360 or 361 is actuated.

In the illustrated example, the rotary body 320 is in the form of a disk, but it may be formed otherwise, or it may be provided as a frame. The rotary body 320 may have any form, so long as it can rotate while securely supporting the motor 340.

This embodiment exemplifies the case in which two power-transmitting electromagnetic clutches 360 and 361 are provided, but other arrangements in which one of the power-transmitting electromagnetic clutches 360 and 361 is not provided are also possible. In this case, however, it is preferable to make the motor 340 capable of rotating in the normal and reverse directions with a view to reducing the time taken to move the rotary body to one the clutch plates 331 previously selected, and the time taken to adjust a seat or the like connected to the output shaft 330 of the same clutch plate 331.

Figure 7:
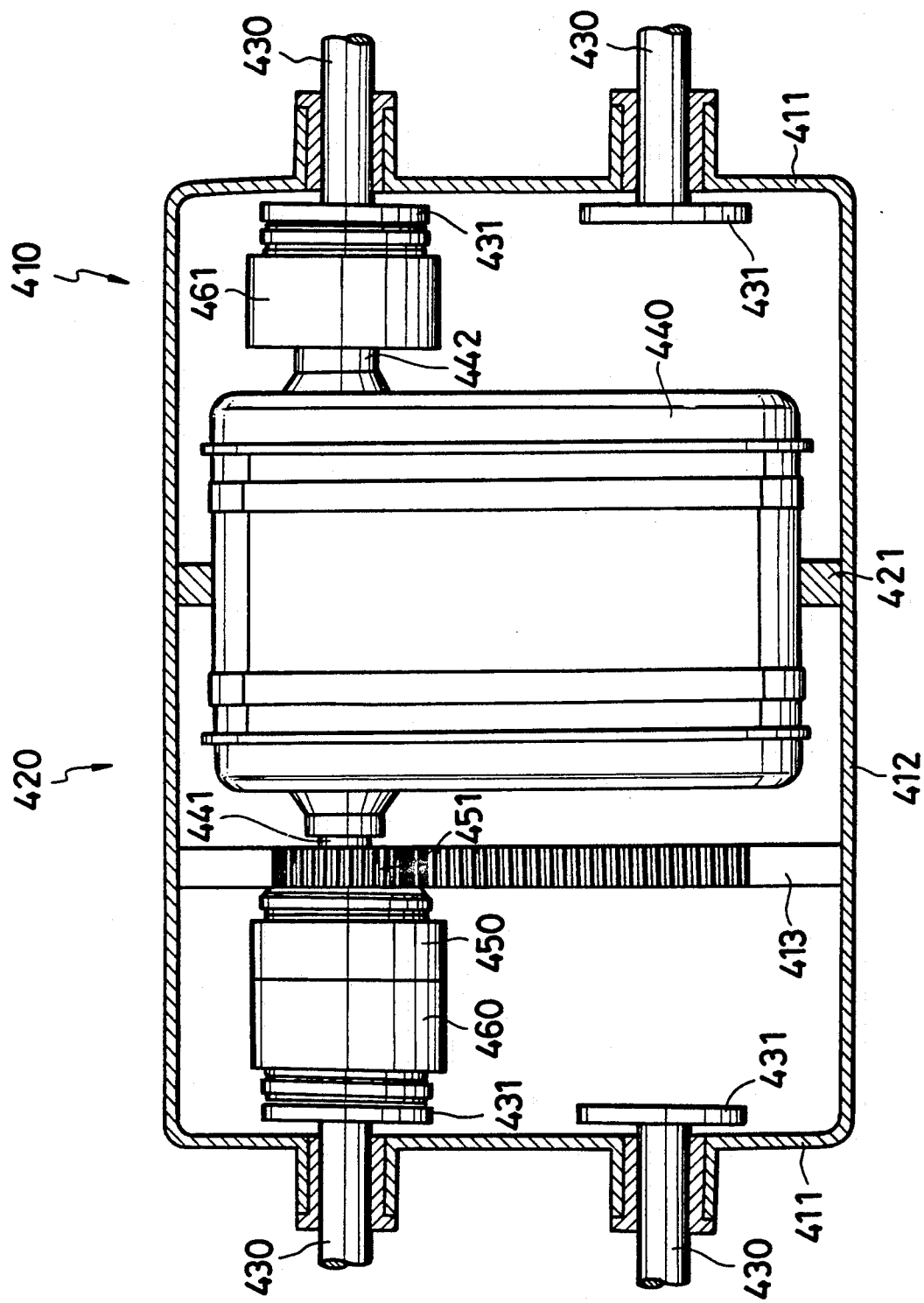
Figure 8:
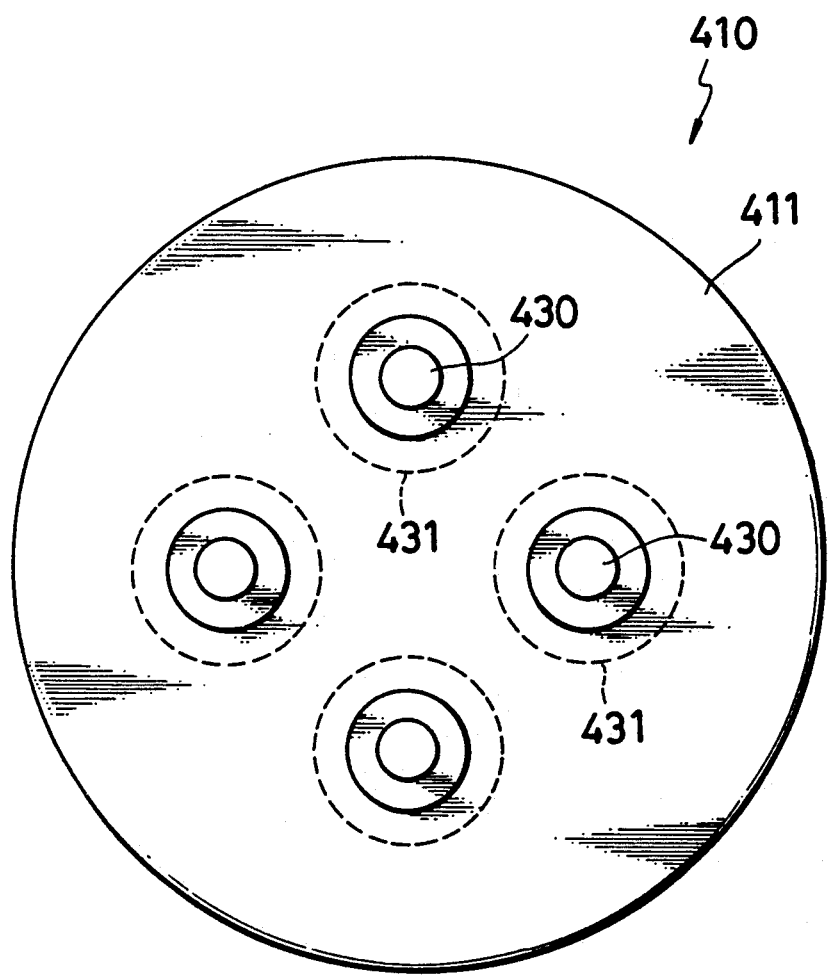
Figure 1:
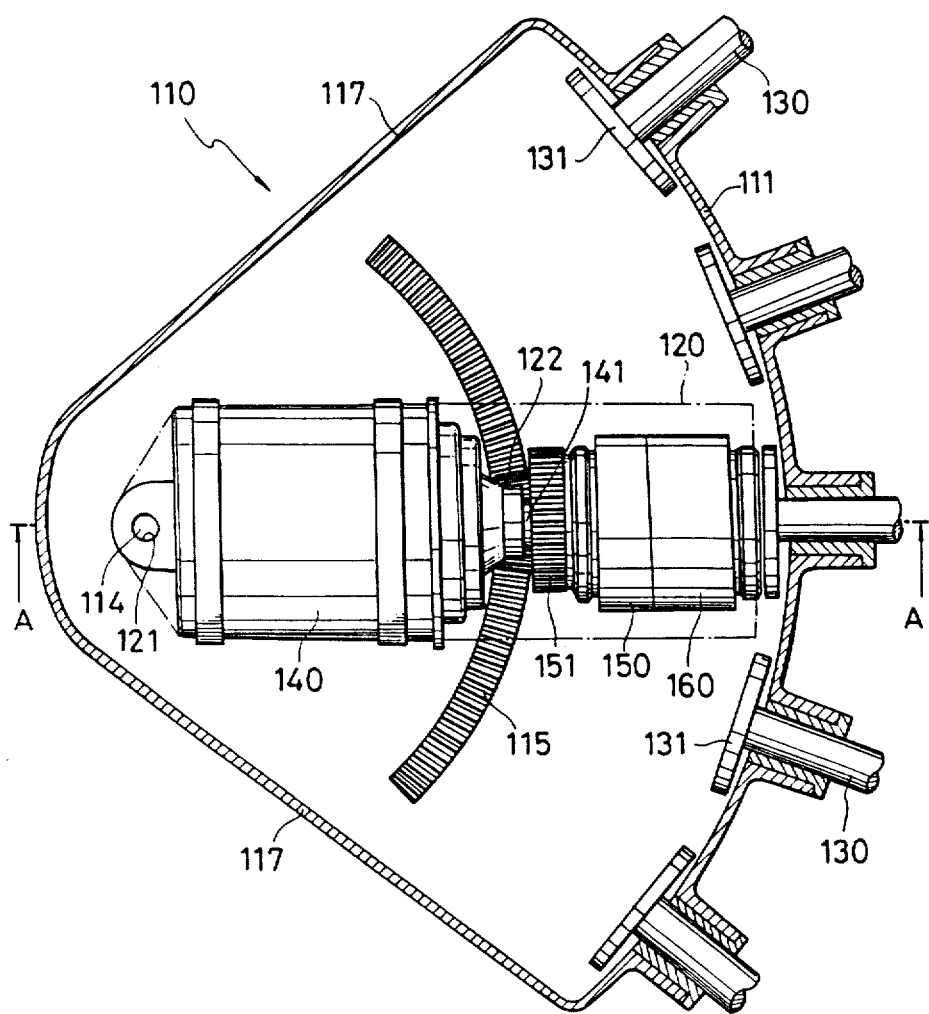
Figure 2:
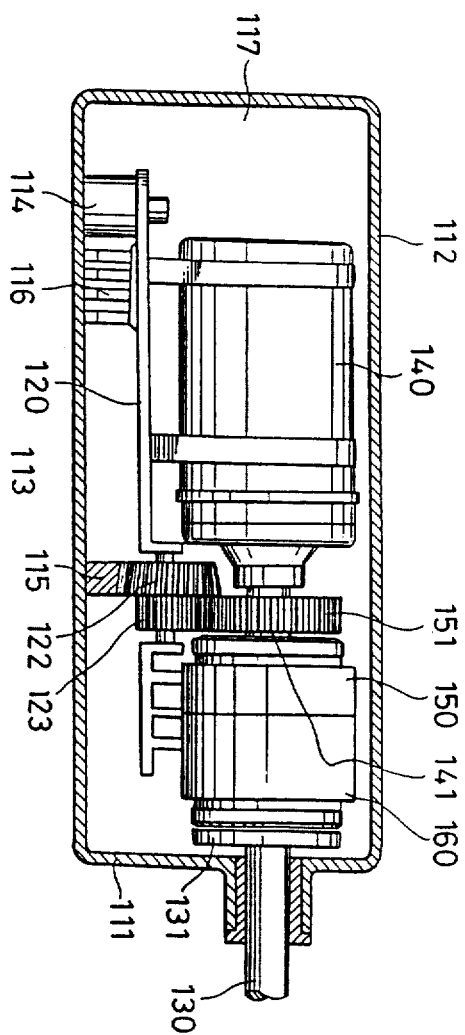
Figure 3:
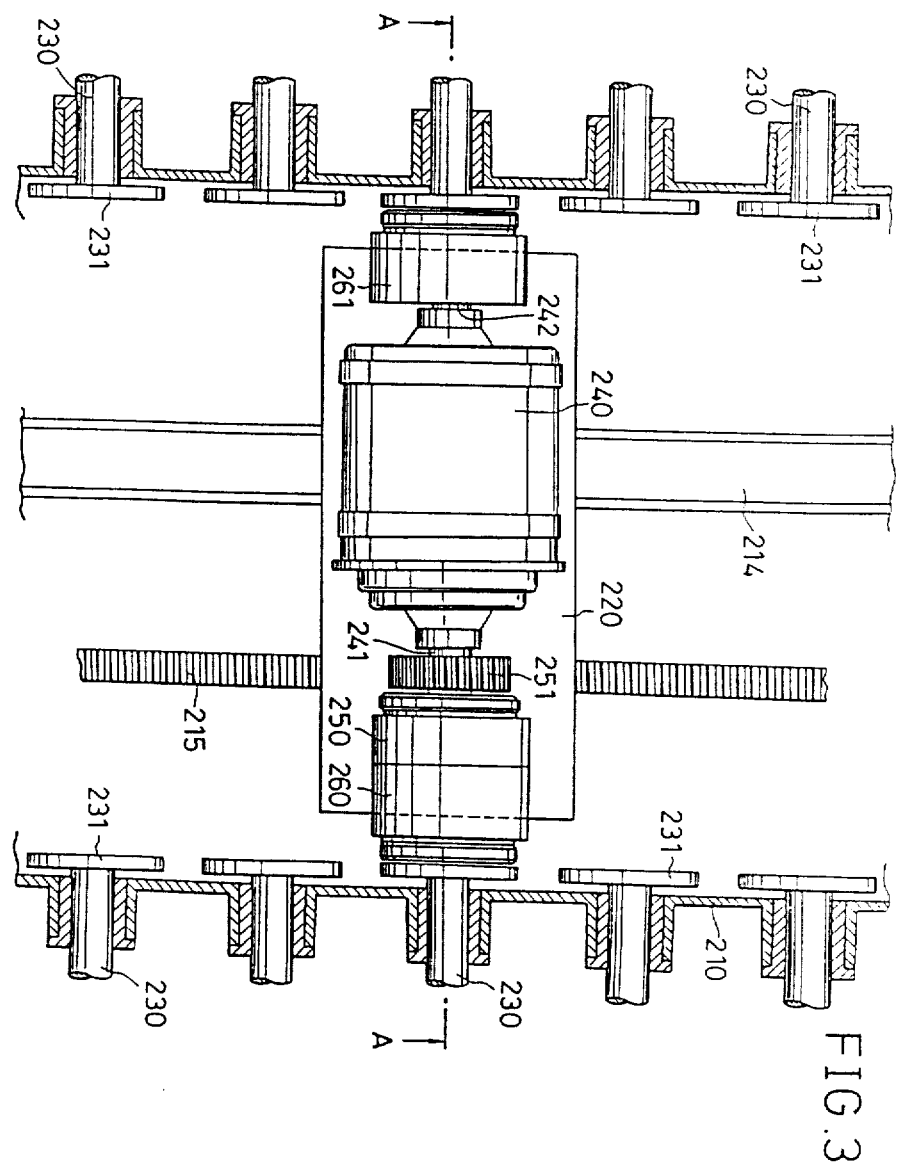

An embodiment shown in FIGS. 7, 8, and 9 is provided with two power-transmitting electromagnetic clutches 460 and 461 which are adapted to rotate like a chamber of a revolver by the operation of a motor 440 and a traveling electromagnetic clutch 450. FIG. 7 is a plan view of this embodiment, FIG. 8 is a cross-sectional view of an example of this embodiment in which speed-reduction motor is used, and FIG. 9 is a cross-sectional view of an example in which a speed-reduction gear is used.

In this embodiment, a rotary body 420 is disposed inside a housing 410, and clutch plates 431 having outwardly extending operating shafts 430 are axially supported in side plates 411 of the housing 410 such that they make equal angles relative to the side plates 411 and are equally spaced from the center of overall rotation of the rotary body 420.

The housing 410 is provided in the form of a cylinder closed at its right and left ends by two side plates 411. An internal gear 413 in the form of a ring is fixed inside the housing 410. Terminals 416 for connection to a power source extend from a left-hand portion of the bottom plate 413 to a motor 440 provided in the rotary body 420.

The rotary body 420 is constituted by the motor 440 which can rotate in only one direction, the traveling electromagnetic clutch 450 fixed to a first output shaft of the motor 440, the first power-transmitting electromagnetic clutch 460, and the second power-transmitting electromagnetic clutch 461 fixed to a second output shaft of the motor 440. In the illustrated example, a rotary ring 421 which rotates by being fixed to the motor 440 is provided, thereby enabling the rotary body 420 to rotate smoothly in a suitable manner in the housing 410.

The traveling electromagnetic clutch 450 is adapted to transmit the torque of the motor 440 from the first output shaft 441 to the internal gear 413 via a pinion gear 451. The torque of the motor 440 is transmitted to the pinion gear 451 by actuating the traveling electromagnetic clutch 450, and the pinion gear 451 is released by disconnecting the traveling electromagnetic clutch 450. Therefore, if the traveling electromagnetic clutch 450 is actuated, the torque of the motor 440 is transmitted to the pinion gear 451 and the internal gear 413, so that, as a result, the rotary body 420 rotates by reaction since the internal gear 415 is fixed to the housing 410.

The first and second power-transmitting electromagnetic clutches 460 and 461 are used in such a manner that one or both of them are actuated so as to transmit the torque of the motor 440 to the clutch plates 431 facing these power-transmitting clutches when the rotary body 420 is stopped at a predetermined position. The clutch plates 431 are released by disconnecting the power-transmitting clutches 460 and 461. Therefore, the torque of the motor 440 is transmitted to the corresponding operating shaft 430 via the clutch plate 431 by actuating one of the power-transmitting clutches 460 and 461.

If, as shown in FIG. 7, the clutch plates 431 are disposed so as to face with each other, either of the first and second power-transmitting electromagnetic clutches 460 and 461 face the clutch plates 431 when the rotation of the rotary body is stopped. Therefore, in this arrangement, torques in opposite directions can be simultaneously transmitted to the clutch plates 431 facing each other by simultaneously actuating the first and second power-transmitting electromagnetic clutches 460 and 461. In this arrangement, it is, of course, possible to rotate only one clutch plate 431 by actuating one of the first and second power-transmitting electromagnetic clutch 460 and 461.

Next, the operation and functions of a power-transmitting apparatus in accordance with this embodiment will be described.

It is assumed here that the rotary body 420 is in the position indicated in FIG. 7 before the apparatus starts to operate, and that the motor 440 is capable of rotating in only one direction.

If, in this state, it is necessary to transmit the torque of the motor 440 to one of the operating shafts 430 which is disposed in the upper-left position shown in FIG. 7, the first power-transmitting electromagnetic clutch 460 is directly actuated without rotating the rotary body 420, until it is magnetically connected to the clutch plate 431 in the upper left position, thereby enabling the torque of the motor 440 to be transmitted as normal rotation to the operating shaft 430 in the upper-left position. During this operation, the traveling electromagnetic clutch 450 is not connected. If, at the same time, the second power-transmitting electromagnetic clutch 461 is actuated, torque of reverse rotation can be transmitted to the clutch plate 431 which is disposed in the upper-right position and which faces the second power-transmitting electromagnetic clutch 461. If both the first and second power-transmitting electromagnetic clutches 460 and 461 are actuated simultaneously, torques in opposite directions can be simultaneously transmitted to the clutch plates 431 in the upper-left and upper-right positions.

Therefore, the clutch plates 431 that faces the first and second power-transmitting electromagnetic clutches 460 and 461 may be adapted to perform the same operation in such a manner that reverse rotation input through each of these clutch plates 431 produces movement in a reverse direction relative to each other, enabling desired functions using the one-direction-rotation motor 440

If one of the operating shafts 430 disposed in a lower-left position is to be operated, the traveling electromagnetic clutch 450 is first actuated and the motor 440 is rotated while the first and second power-transmitting electromagnetic clutches 460 and 461 are disengaged, so that the torque of the motor 440 is successively transmitted via the traveling electromagnetic clutch 450 to the pinion gear 451 and the internal gear 413, thereby rotating the rotary body 420 about the center of the rotary ring 421. When, during this rotation, the first power-transmitting electromagnetic clutch 460 is placed in the lower position, the traveling electromagnetic clutch 450 is disconnected so that the first power-transmitting electromagnetic clutch 460 is made to face the clutch plate 431 in the lower position shown in FIG. 7.

When the traveling electromagnetic clutch 450 is disconnected, the pinion gear 451 is released relative to the rotation of the motor 440. At this point, the first power-transmitting electromagnetic clutch 460 is actuated so that it is magnetically connected to the clutch plate 431 in the lower-left position shown in FIG. 7, thereby enabling the torque of the motor 440 to be transmitted as normal-direction rotation to the clutch plate 431 in the lower-left position.

If, in this state, the motor 440 rotates, the torque of the motor 440 is transmitted as normal rotation via the first power-transmitting electromagnetic clutch 460 and the clutch plate 431 to the operating shaft 430 in the lower-left position shown in FIG. 7.

The torque of the motor 440 can also be transmitted to one of the other clutch plates 431 shown in FIGS. 7 and 8 in a simple manner. That is, the rotary body 420 can be rotated in the same manner, and the first or second power-transmitting electromagnetic clutch 460 or 461 is magnetically connected to the clutch plate 431 at the predetermined position.

If the motor 440 can rotate in the normal and reverse directions, the direction in which the rotary body 420 rotates to select the clutch plate in a predetermined position can be changed as desired, enabling a reduction in the time taken to select the clutch plates 431. The use of this type of motor is very convenient, because it is thereby possible to perform a desired operation by alternately transmitting the torque of the motor through each of the power-transmitting electromagnetic clutches 460 and 461 without disconnecting it.

FIG. 9 is a cross-sectional view of an example in which a speed-reduction motor is used as the motor 440.

As is illustrated in FIG. 9, the motor is designed such that the output shaft 441 is disposed at an intermediate position between the center of rotation of the motor 440 and the outer periphery thereof so as to make the center of rotation of the rotary body 420 coincide with the center axis of the motor 440.

If the apparatus is constructed in this manner, the rotary ring 421 can be formed as a ring having a constant thickness and, at the same time, the terminals 414 can be easily mounted. Moreover, it is possible to eliminate the need to provide the rotary ring 421 by making the motor 440 rotate in the housing 410 directly relative to the housing. If this method is applied instead of using the rotary ring 421, a bearing or the like may be disposed on the outer periphery of the motor 440 or the inner periphery of the housing 410, thereby enabling the motor to rotate smoothly.

In this embodiment, the rotary body is constituted by one motor 440 and two types of electromagnetic clutches 450, 460, and 461, thereby enabling the torque of the single motor 440 to eight operating shafts adapted for different operations.

Since, in this embodiment, the rotary body 420 is rotated by the traveling electromagnetic clutch 450, there is no need for the provision of another power source for rotating the rotary body 420.

This embodiment exemplifies the case in which eight clutch plates 431 are disposed at equal pitches. However, the pitch and number of the clutch plates can be selected as desired.

The power-transmitting electromagnetic clutches 460 and 461 can prevent overloading of the motor 440 in such a manner that they slide if the operating shafts 430 become overloaded because of an interruption to the movement of the mechanism caused by, for example, an extraneous body caught on a rail on which a seat moves. Therefore, there is no possibility of damaging of the motor 440 due to external causes. This can also be said with respect to the traveling electromagnetic clutch 450.

It is preferable to enable the axes of the power-transmitting electromagnetic clutches 460 and 461 and the clutch plates 431 to coincide with each other, since these members transmit torques through the connection therebetween. This can be enabled by stopping the rotation of the rotary body 420 at a position at which the axes of the power-transmitting electromagnetic clutches 460 and 461 and the desired clutch plate coincide with each other. If it is technically difficult to accurately position the clutches, the contact surfaces of the power-transmitting electromagnetic clutch 460 or 461 and the corresponding clutch plate 431 may be formed such that one of them is convex cone and the other has a complementary concave form, thereby enabling the power-transmitting electromagnetic clutch 460 or 461 and the clutch plate 431 to be aligned with each other when the clutch 460 or 461 is actuated.

It is possible to replace the internal gear 413 with an external gear disposed around the center axis of the housing 410.

This embodiment has exemplified the case in which two power-transmitting electromagnetic clutches 460 and 461 are provided, but other arrangements in which one of the power-transmitting electromagnetic clutches 460 and 461 is not provided are also possible. In this case, however, it is preferable to make the motor 440 capable of rotating in the normal and reverse directions with a view to reducing the time taken to move the rotary body to one of the clutch plates 431 previously selected, and the time taken to adjust a seat or the like connected to the output shaft 430 of the same clutch plate 431.

While the invention has been particularly shown and described in reference to preferred embodiments thereof, it will be understood by those skilled in the art that changes in form and details may be made therein without departing from the spirit and scope of the invention.

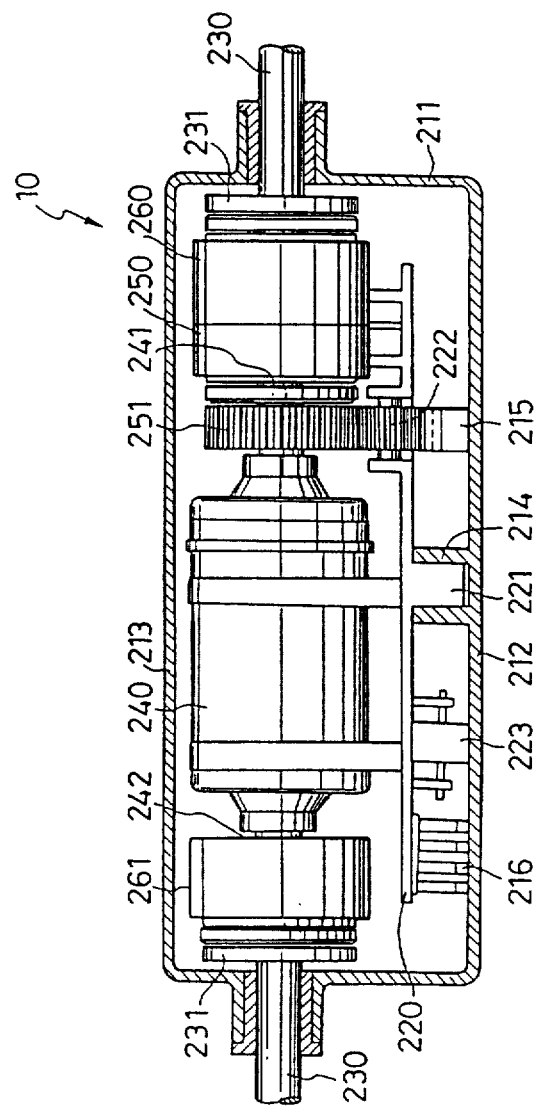

What is claimed is:

1. A power transmitting apparatus for use in a vehicle, comprising:

a motor having at least one output shaft to which a traveling electromagnetic clutch and at least one power-transmitting electromagnetic clutch are attached;

a plurality of clutch plates capable of being connected to said power-transmitting electromagnetic clutch while being aligned therewith; and operating shafts fixed to said clutch plates;

wherein said power-transmitting electromagnetic clutch is moved by the operation of said traveling electromagnetic clutch and the rotation of said motor to a position at which said power-transmitting clutch can be connected to a desired one of said clutch plates.

2. A power transmitting apparatus for use in a vehicle according to claim 1, wherein the number of said at least one output shaft is two, and the number of said at least one power-transmitting electromagnetic clutch is two, and wherein said traveling electromagnetic clutch and one of said power-transmitting electromagnetic clutches are connected to one of said output shafts while the other one of said power-transmitting electromagnetic clutches is connected to the other one of said output shafts.

3. A power transmitting apparatus for use in a vehicle according to claim 1, wherein said motor, said traveling electromagnetic clutch and said power-transmitting electromagnetic clutch are disposed on a rotary body, a support shaft is disposed on said rotary body at a position opposite to the position of said power-transmitting electromagnetic clutch, and an arcuate gear centered on the axis of said support shaft is disposed below said rotary body;

wherein a gear in mesh with said arcuate gear is connected to said traveling electromagnetic clutch when said traveling electromagnetic clutch is actuated; and wherein said plurality of clutch plates are disposed around said rotary body at positions at which said power-transmitting electromagnetic clutch faces one of said clutch plates when said rotary body steps rotating.

4. A power transmitting apparatus for use in a vehicle according to either one of claims 1 and 2, wherein said motor, said traveling electromagnetic clutch and said power-transmitting electromagnetic clutch are disposed on a traveling body, and a linear gear is disposed below said traveling body;

wherein a gear in mesh with said linear gear is connected to said traveling electromagnetic clutch when said traveling electromagnetic clutch is actuated; and wherein said plurality of clutch plates are disposed around said traveling body at positions at which said power-transmitting electromagnetic clutch faces one of said clutch plates when said traveling body stops.

5. A power transmitting apparatus for use in a vehicle according to either one of claims 1 and 2, wherein said motor, said traveling electromagnetic clutch and said power-transmitting electromagnetic clutch are disposed on a rotary body, and a gear in the form of a ring is disposed below said rotary body;

wherein a gear in mesh with said ring-like gear is connected to said traveling electromagnetic clutch when said traveling electromagnetic clutch is actuated; and wherein said plurality of clutch plates are disposed around said rotary body at positions at which said power-transmitting electromagnetic clutch faces one of said clutch plates when said rotary body stops rotating.

6. A power transmitting apparatus for use in a vehicle according to either one of claims 1 and 2, wherein said motor, said traveling electromagnetic clutch constitute a rotary body which is rotatably inserted into a housing, and a first gear disposed in said housing;

wherein a second gear in mesh with said first gear is connected to said traveling electromagnetic clutch when said traveling electromagnetic clutch is actuated; and wherein said plurality of clutch plates are disposed in said housing at positions at which said power-transmitting electromagnetic clutch faces one of said clutch plates when said rotary body stops rotating.

* * * * *

UNITED STATES PATENT AND TRADEMARK OFFICE
CERTIFICATE OF CORRECTION

PATENT NO. : 5,009,296

DATED : April 23, 1991

INVENTOR(S) : Osamu Ohkawa, et al.

It is certified that error appears in the above-identified patent and that said Letters Patent is hereby corrected as shown below:

The title page should be deleted to appear as per attached title page.

Signed and Sealed this

Sixth Day of April, 1993

Attest:

STEPHEN G. KUNIN

Attesting Officer

Acting Commissioner of Patents and Trademarks

United States Patent

Ohkawa et al.

[11] Patent Number: 5,009,296
[45] Date of Patent: Apr. 23, 1991

[54] POWER TRANSMITTING APPARATUS FOR USE IN VEHICLE

[75] Inventors: Osamu Ohkawa, Sakato; Tetsuya Tamahoko, Koganei; Eisuke Imanaga, Tokyo, all of Japan

[73] Assignee: Tokyo Seat Co., Ltd., Asaka, Japan

[21] Appl. No.: 366,195

[22] Filed: Jun. 8, 1989

Related U.S. Application Data

[63] Continuation-in-part of Ser. No. 135,948, Dec. 21, 1987, abandoned.

[30] Foreign Application Priority Data

| Dec. 24, 1986 | [JP] | Japan | 61-313567 |
| Dec. 24, 1986 | [JP] | Japan | 61-313568 |
| Dec. 24, 1986 | [JP] | Japan | 61-313569 |
| Dec. 24, 1986 | [JP] | Japan | 61-313570 |
| Dec. 24, 1986 | [JP] | Japan | 61-313571 |
| Dec. 24, 1986 | [JP] | Japan | 61-313572 |

[51] Int. Cl.⁵ .................. B60N 1/06; F16H 19/04; F16D 27/12
[52] U.S. Cl. .................. 192/20; 74/664; 74/665 F; 74/665 GA; 192/48.2; 192/48.91; 192/84 AA
[58] Field of Search .................. 192/0.02 R, 0.098, 20, 192/48.2, 48.91, 82 P, 84 AA, 84 AB; 74/664, 665 F, 665 GA, 665 GB, 665 GC, 849; 310/40.5; 318/4, 115

[56] References Cited

U.S. PATENT DOCUMENTS

| 2,271,207 | 1/1942 | Rhein | 318/4 |
| 2,965,208 | 12/1960 | Forster et al. | 74/813 |
| 3,073,180 | 1/1963 | Lohr | 74/665 GA |
| 3,406,795 | 10/1968 | Pickles | 192/0.02 R |
| 3,547,240 | 12/1970 | Hopler | 192/84 AA |
| 3,686,974 | 8/1972 | Little Jr. | 74/665 GA |
| 4,208,619 | 6/1980 | Delebecque et al. | 318/4 |
| 4,284,935 | 8/1981 | March et al. | 318/280 |

FOREIGN PATENT DOCUMENTS

| 63-159151 | 7/1988 | Japan . |
| 63-159152 | 7/1988 | Japan . |
| 63-159153 | 7/1988 | Japan . |
| 63-159154 | 7/1988 | Japan . |
| 63-162348 | 7/1988 | Japan . |
| 63-163057 | 7/1988 | Japan . |

Primary Examiner—Rodney H. Bonck
Attorney, Agent, or Firm—Armstrong, Nikaido, Marmelstein, Kubovcik & Murray

[57] ABSTRACT

A power transmitting apparatus for use in a vehicle, provided with a motor having at least one output shaft to which a traveling electromagnetic clutch and at least one power-transmitting electromagnetic clutch are attached, a plurality of clutch plates capable of being connected to the power-transmitting electromagnetic clutch while being aligned therewith, and operating shafts fixed to the clutch plates. The power-transmitting electromagnetic clutch is moved by the operation of the traveling electromagnetic clutch and the rotation of the motor to a position at which the power-transmitting clutch can be connected to one of the clutch plates selected as desired.

6 Claims, 9 Drawing Sheets

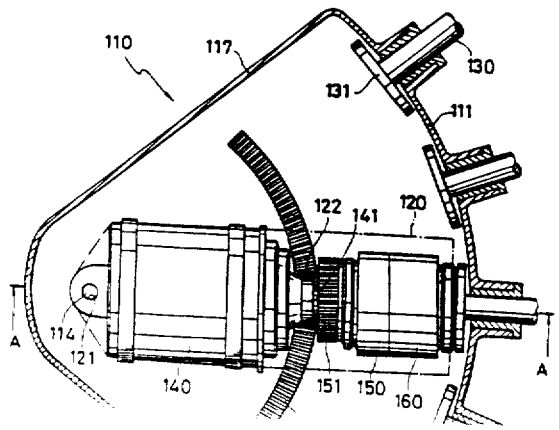

UNITED STATES PATENT AND TRADEMARK OFFICE
CERTIFICATE OF CORRECTION

PATENT NO. : 5,009,296
DATED : April 23, 1991
INVENTOR(S) : OHKAWA et al

It is certified that error appears in the above-identified patent and that said Letters Patent is hereby corrected as shown below:

On the drawing sheet 1 of 9, delete Fig. 1 and insert new Fig. 1, as shown on the attached page.

On the drawing sheet 2 of 9, delete Fig. 2 and insert new Fig. 2, as shown on the attached page.

On the drawing sheet 4 of 9, delete Fig. 4 and insert new Fig. 4, as shown on the attached page.

On the drawing sheet 5 of 9, delete Fig. 5 and insert new Fig. 5, as shown on the attached page.

On the drawing sheet 6 of 9, delete Fig. 6 and insert new Fig. 6, as shown on the attached page.

Column 13, line 59, delete "If the" and insert --The--.